United States Patent
Jung

(10) Patent No.: US 8,593,590 B2
(45) Date of Patent: Nov. 26, 2013

(54) LIGHTING APPARATUS AND DISPLAY DEVICE INCLUDING THE SAME

(75) Inventor: Muntae Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/512,978

(22) PCT Filed: Aug. 9, 2011

(86) PCT No.: PCT/KR2011/005771
§ 371 (c)(1),
(2), (4) Date: May 31, 2012

(87) PCT Pub. No.: WO2012/111893
PCT Pub. Date: Aug. 23, 2012

(65) Prior Publication Data
US 2012/0274882 A1   Nov. 1, 2012

(30) Foreign Application Priority Data
Feb. 14, 2011   (KR) .................. 10-2011-0012797

(51) Int. Cl.
*G02F 1/1335*   (2006.01)
(52) U.S. Cl.
USPC ............ 349/69; 349/64; 349/96; 257/13; 257/E33.005; 257/E33.061; 362/97.3
(58) Field of Classification Search
USPC ............ 349/64, 69, 96; 257/13, E33.005
See application file for complete search history.

(56) References Cited

U.S. PATENT DOCUMENTS

| | | | | |
|---|---|---|---|---|
| 2006/0274228 | A1* | 12/2006 | Komoto et al. | 349/71 |
| 2008/0074583 | A1* | 3/2008 | Li et al. | 349/71 |
| 2009/0180055 | A1* | 7/2009 | Kim et al. | 349/69 |
| 2009/0213296 | A1* | 8/2009 | Park et al. | 349/62 |
| 2010/0053930 | A1* | 3/2010 | Kim et al. | 362/84 |
| 2010/0297431 | A1* | 11/2010 | Lee | 428/323 |
| 2011/0241044 | A1* | 10/2011 | Jang et al. | 257/98 |
| 2012/0162573 | A1* | 6/2012 | Takahashi et al. | 349/61 |
| 2012/0168724 | A1* | 7/2012 | Park et al. | 257/29 |

FOREIGN PATENT DOCUMENTS

| | | | | |
|---|---|---|---|---|
| JP | 2007-119735 | * | 5/2007 | ............ C09K 5/08 |
| JP | 2007-119735 A | | 5/2007 | |
| KR | 10-2009-0091509 A | | 8/2009 | |
| KR | 10-2010-0043193 A | | 4/2010 | |
| KR | 10-2010-0087851 | * | 8/2010 | ............ H01L 33/50 |
| KR | 10-2010-0087851 A | | 8/2010 | |
| KR | 10-2010-0094908 | * | 8/2010 | ............ F21S 2/00 |
| KR | 10-2010-0094908 A | | 8/2010 | |
| KR | 10-2012-0065273 A | | 6/2012 | |

OTHER PUBLICATIONS

International Search Report and Written Opinion dated Feb. 16, 2012 issued in Application No. PCT/KR2011/005771.

* cited by examiner

*Primary Examiner* — Edward Glick
*Assistant Examiner* — Sang V Nguyen
(74) *Attorney, Agent, or Firm* — KED & Associates, LLP

(57) ABSTRACT

A lighting apparatus and a display device including the same are disclosed. The present invention relates to a lighting apparatus, which can enhance resistance against gas or humidity and which can present a stable optical property and which can enhance light-emitting efficiency, and a display device including the lighting apparatus.

6 Claims, 7 Drawing Sheets

(a)

(b)

LIGHTING APPARATUS AND DISPLAY DEVICE INCLUDING THE SAME

TECHNICAL FIELD

The present invention relates to a lighting apparatus and a display device including the same, more particularly, to a lighting apparatus, which can enhance resistance against gas or humidity and which can present a stable optical property and which can enhance light-emitting efficiency, and a display device including the lighting apparatus.

BACKGROUND ART

Generally, the lighting industry has a history which is as old as development of civilization, with close relationship with humankind.

Such the lighting industry has been under continuous progress. Search on light sources, light-emitting methods, driving methods and efficiency improvement has been worked variously.

Light sources typically used in the lighting so far may be incandescent lamps, electric discharge lamps and fluorescent lamps, and they are used for a variety of purposes including home use, landscape use and industrial use.

Among them, a resistive light source such as an incandescent lamp has a low efficiency and a heat generation problem. An electric discharge lamp has problems of a high price and a high voltage. A fluorescent lamp has an environmental disadvantage of mercury usage.

To overcome disadvantages of those light sources, interests in light emitting diodes (LEDs) having advantages of light-emitting efficiency, color variety and design autonomy have been increasing gradually.

A light emitting diode (LED) is a semiconductor element which emits a light when a voltage is applied thereto forwardly. The light emitting diode (LED) has a long usage life, low power consumption, with electrical, optical and physical properties which are proper to mass production and the light emitting diodes (LED) have been replacing the incandescent lamps and fluorescent lamps.

DISCLOSURE OF INVENTION

Technical Problem

An object of the present invention is to provide a lighting apparatus which can enhance resistance against gas or humidity, and a display device including the same.

Another object of the present invention is to provide a lighting apparatus which can embody stable optical properties and enhance light-emitting efficiency, and a display device including the same.

Solution to Problem

To achieve these objects and other advantages and in accordance with the purpose of the invention, as embodied and broadly described herein, a lighting apparatus includes a housing; a light emitting unit arranged in the housing; and a light conversion unit comprising a substrate arranged in front of the light emitting unit, a quantum dot layer formed on the substrate and a protection layer which surrounds the quantum dot layer.

Here, the protection layer may be formed of grapheme.

In another aspect of the present invention, a lighting apparatus includes a housing; a light emitting unit comprising a substrate arranged in the housing and at least one LED mounted on the substrate; and a light conversion unit comprising a quantum dot layer formed on a top surface of the LED and a protection layer which surrounds the quantum dot layer.

Here, the protection layer may be formed of graphene.

In a further aspect of the present invention, a display device includes a light source part comprising at least one LED; a light conversion unit comprising a substrate arranged in front of the light source part, a quantum dot layer formed on the substrate and a protection layer which surrounds the quantum dot layer; a color filter arranged in front of the light conversion unit; and a liquid crystal part arranged in front of the color filter, the liquid crystal part which transmits and shuts off lights selectively.

Advantageous Effects of Invention

Therefore, the present invention has following advantageous effects. The lighting apparatus and the display device including the lighting apparatus according to the present invention may enhance resistance against gas or humidity.

Furthermore, the lighting apparatus according to the present invention and the display device including the lighting apparatus may embody a stable optical property and enhance light-emitting efficiency. It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide further understanding of the disclosure and are incorporated in and constitute a part of this application, illustrate embodiments of the disclosure and together with the description serve to explain the principle of the disclosure.

In the drawings.

BEST MODE FOR CARRYING OUT THE INVENTION

Figure 1:
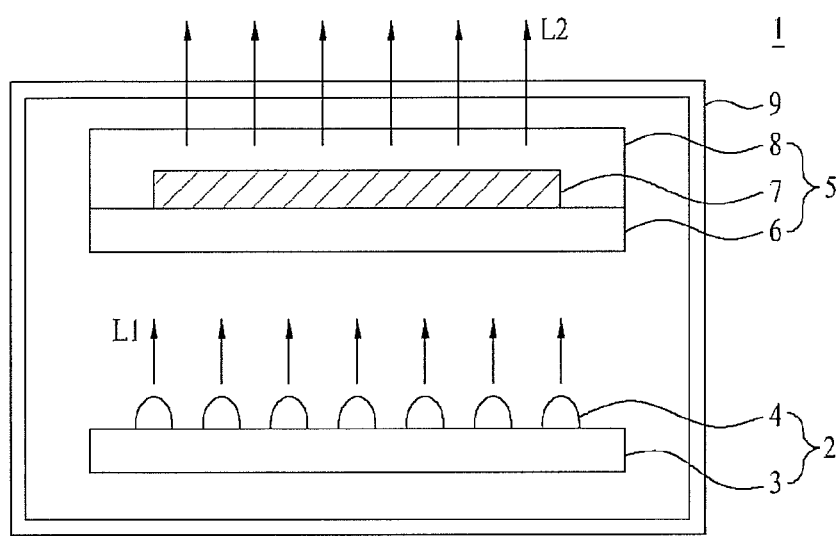
FIG. 1 is a block view illustrating a lighting apparatus according to an exemplary embodiment of the present invention.

As follows, a lighting apparatus according to an exemplary embodiment of the present invention and a display device including the lighting apparatus will be described in reference to the accompanying drawings. Reference will now be made in detail to the specific embodiments of the present invention, examples of which are illustrated in the accompanying drawings.

Wherever possible, the same reference numbers will be used throughout the drawings to refer to the same or like parts and repeated description will be omitted. The size and appearance of each component shown in the drawings may be exaggerated or diminished for convenient explanation.

Terminology including ordinal numbers such as 'first' and 'second' may be used in describing a variety of components and the components are not limited by the terminological expressions and the terminological expressions are used only for distinguish one of the components from the others.

FIG. 1 is a block view illustrating a lighting apparatus 1 related to an exemplary embodiment of the present invention.

In reference to FIG. 1, the lighting apparatus 1 according to the exemplary embodiment includes a housing 9, a light emitting unit 2 arranged in the housing 9 and a light conversion unit 5 including a substrate 6 arranged in opposite to the light emitting unit 2, a quantum dot layer 7 formed on the substrate 6 and a protection layer 8 surrounding the quantum dot layer 7.

The light emitting unit 2 may include a base substrate 3 and one LED or more 4 mounted on the base substrate 3. The LED may be a blue light emitting diode or an ultraviolet light emitting diode.

In the meanwhile, the light conversion unit 5 includes quantum dot particles. The quantum dot is a nano-sized semiconductor material having a quantum confinement effect and it will generate a stronger light in a narrow wavelength, than a conventional phosphor.

Furthermore, the light emitting of the quantum dot is generated while an electrode in an excited state is transited from a conduction band to a balance band. In case of the same materials may have different wavelengths which can be variable according to the sizes of particles composing the materials.

Specifically, as the size of the quantum dot is getting smaller, a light (a blue line color light) having a shorter wavelength is emitted. Because of that, if the size of the quantum dot is adjusted, a light having a desired wavelength may be gained. The quantum dot can be luminescent even if an excitation wavelength is selected arbitrarily. Even if several kinds of quantum dots are excited in a single wavelength, various color lights can be observed at one time. In addition, the quantum dot is transited from a ground vibration state of the conduction band only to a ground vibration state of the balance band. Because of that, the quantum dot has a property that a light emitting wavelength is an almost single color.

Owing to those properties of the quantum dot, the lighting apparatus 1 according to the exemplary embodiment of the present invention may present each of colors (R, G and B) of lights irradiated from light sources (for example, LEDs) clearly and it may emit strong lights (L2) only to enhance a brightness remarkably.

The quantum dot composing the quantum dot layer 7 may be formed of II-VI group, III-V group, IV-VI group, IV group semiconductor compounds and mixture of them. Specifically, it may be formed of one selected from a group of CdS, CdSe, CdTe, ZnSe, ZnTe, InP and InAs or a mixture of two or more selected from the group. In addition, the quantum dot may have a core structure or a core-shell structure.

In the meanwhile, the quantum dot layer 7 has a property of vulnerability to gas or humidity. In other words, if it is exposed to gas or humidity, the quantum dot layer 7 is vulnerable to corruption and the optical property might be deteriorated.

As a result, the lighting apparatus 1 according to the present invention include a protection layer 8 for surrounding the quantum dot layer 7 to protect the quantum dot layer 7 from the gas or the humidity.

The protection layer 8 may be formed of resin or glass, preferably, graphene. The graphene has good light transmissivity and good resistance against gas and humidity. Because of that, reliability of the light conversion unit 5 may be enhanced. Also, the thickness of the graphene is slim enough to embody a slim lighting apparatus.

The graphene may be formed on the quantum dot layer 7 in a screen printing, inkjet printing, off-set printing or laser printing process. The graphene may be formed of a single layer or two or more layers. In addition, the graphene may be formed to surround a predetermined region of the quantum dot layer 7 or an entire region of the quantum dot layer 7.

Here, the substrate 6 of the light conversion unit 5 may be formed of a light-transmittable material.

Figure 2:
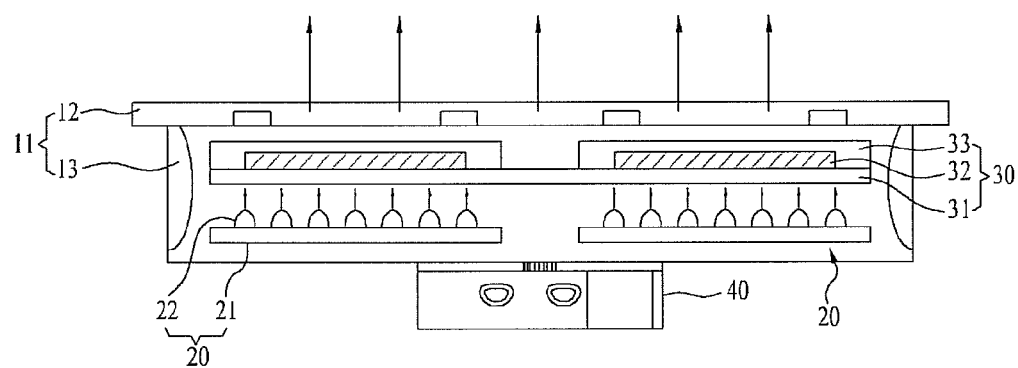
FIG. 2 is a side sectional view illustrating a lighting apparatus according to another embodiment of the present invention.

FIG. 2 is a side sectional view illustrating a lighting apparatus 10 according to another embodiment of the present invention.

Figure 4:
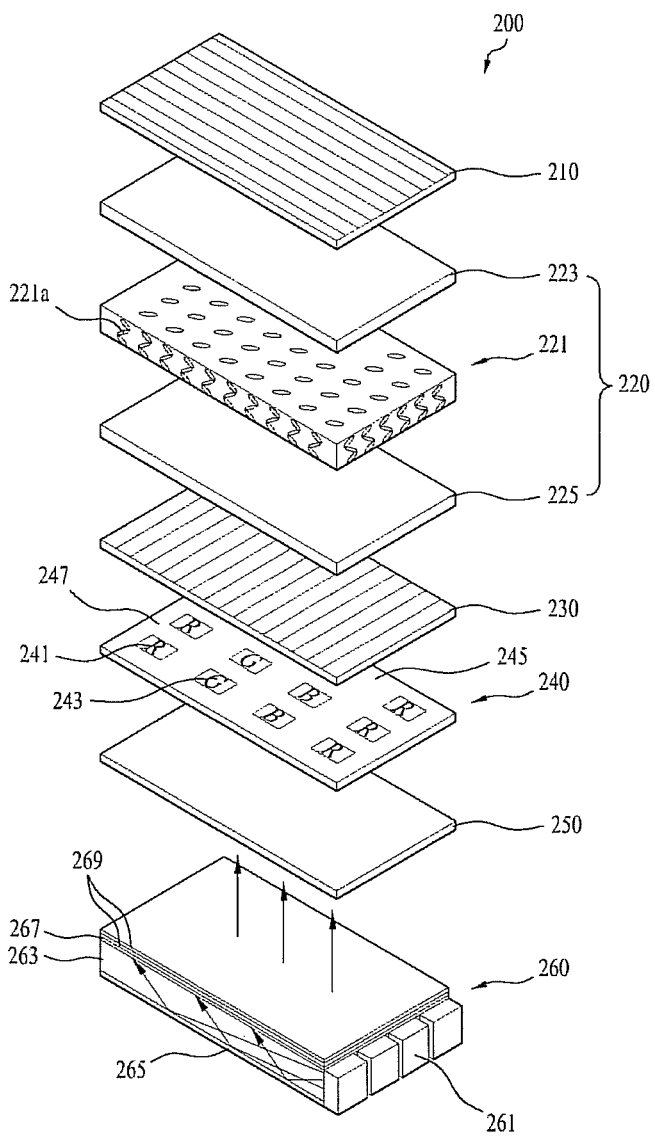
FIG. 4 is an exploded perspective view illustrating the display device shown in FIG. 3.

In reference to FIG. 4, the lighting apparatus 10 according to this embodiment includes a housing 11, a plurality of light emitting units 20 arranged in the housing 11, a light conversion unit 30 arranged in opposite to the light emitting units and a converter 40 for supplying an electric power to the light emitting unit.

The housing 11 may have a variety of appearances, considering an installation place and design aspects of a lighting room. According to an embodiment, the housing 11 may include a front case 12 having a light-emitting surface and a rear case 13 built in an installation place.

The light emitting unit 20 may include a base substrate 21 and at least one LED mounted on the base substrate 21. A plurality of light emitting units 20 may be arranged in the housing along a horizontal, vertical or radial direction.

The light conversion unit 30 includes a substrate 31 formed of a light transmittable material, a quantum dot layer 32 formed on the substrate and a protection layer 33 formed of graphene, to surround the quantum dot layer 32. Here, the plurality of the quantum dot layers 32 may be formed on a predetermined region of the substrate 32, corresponding to the plurality of the light emitting units 20, respectively.

Alternatively, a lighting apparatus according to a further embodiment of the present invention includes a housing, a substrate arranged in the housing, a light emitting unit having at least one LED mounted on the substrate and a light conversion unit having a quantum dot layer formed on a top of the LED and a protection layer surrounding the quantum dot layer.

Here, it is preferable that the protection layer is formed of graphene.

In other words, the lighting apparatus according to this embodiment may form the quantum dot layer on the top of the LED, without an auxiliary substrate used to form the quantum dot layer.

Figure 3:
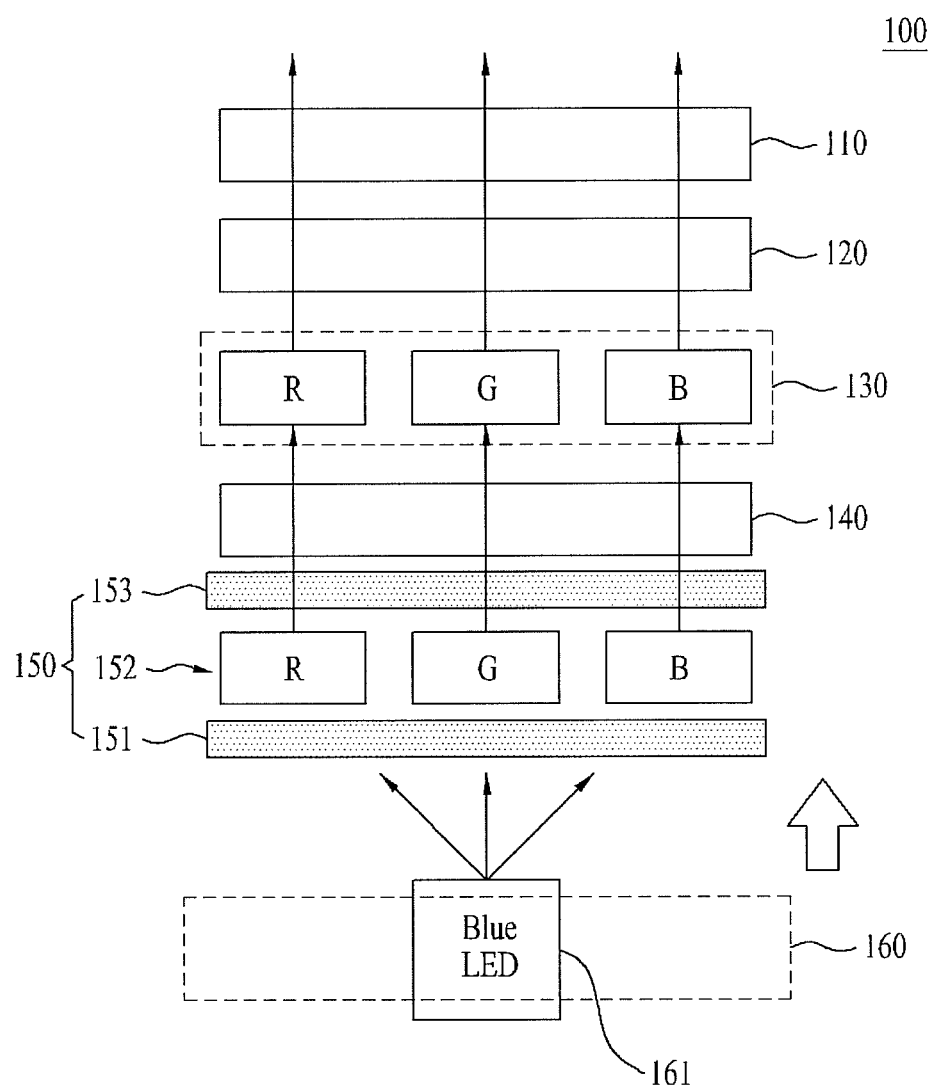
FIG. 3 is a block view illustrating a configuration of a display device related to the exemplary embodiment of the present invention.

FIG. 3 is a block view illustrating a display device according to an exemplary embodiment of the present invention. FIG. 4 is an exploded perspective view illustrating the display device shown in FIG. 3.

A display device 100 and 200 disclosed in the present specification refers to a device which can display an image signal input from the outside. The display device includes a monitor capable of displaying an image received by a computer and a television capable of displaying an image and a sound transmitted from a broadcasting station, and it includes all of devices capable of displaying external input images simultaneously.

For example, the display device may include a display part of a mobile terminal including a cellular phone, a smart phone, a laptop computer, a digital broadcasting terminal, a personal digital assistance (PDA), a portable multimedia player (PMP) and a navigation.

FIG. 3 is a block view illustrating a display device according to an exemplary embodiment of the present invention. FIG. 4 is an exploded perspective view illustrating the display device shown in FIG. 3.

In reference to FIG. 3, the display device 100 according to the exemplary embodiment of the present invention includes a light source part 160 having at least one LED 161, a light conversion unit 150 having a substrate 151 arranged in front of the light source part 161, a quantum layer 152 formed on the substrate 151 and a protection layer 153 for surrounding the quantum dot layer 152, a color filter 130 arranged in front of the light conversion unit 150 and a liquid crystal part 120 arranged in front of the color filter 130 to transmit and shut lights selectively.

The protection layer 153 may be formed of a light transmittable resin or glass, preferably, graphene.

The graphene may be formed on the substrate 151 as the protection layer 153 in a screen printing, inkjet printing, off-set printing or laser printing process. The graphene may be formed of a single layer or two or more layers.

In addition, the graphene may be formed to surround a predetermined region of the quantum dot layer 152 or an entire region of the quantum dot layer 152.

The display device 100 may further include polarizing films 110 and 140 arranged in front and rear of the liquid crystal part 120, respectively.

FIG. 4 illustrating a display device 200 according to an embodiment in case of the light source part 160 is a backlight unit (BLU). The backlight unit is embodied as an edge type allowing the LED 261 to irradiate lights toward an edge of a light guide plate 263.

In reference to FIG. 4, the display device 200 includes an upper polarizing film 210, a liquid crystal part 220, a lower polarizing film 230, a color filter 240, a light conversion unit 250 and a backlight unit 260.

The upper and lower polarizing films 210 and 230 are arranged on and under the liquid crystal part 220, respectively, and they polarize lights irradiated from the backlight unit 260. Here, it is preferable that a polarization direction of the upper polarizing film 210 is perpendicular to a polarization direction of the lower polarizing film 230.

The liquid crystal part 220 may include a liquid crystal layer 221 having a plurality of liquid crystal particles 221a and upper and lower glass substrates 223 and 225 arranged on and under the liquid crystal layer 221, respectively.

The plurality of the liquid crystal particles 221a may be arranged in the liquid crystal layer 221, with being twisted. When a voltage is applied, the twist of the liquid crystal particles 221a is loosened to allow the lights irradiated from the backlight unit 260 to move straight. The liquid crystal part 220 may transmit or shut off the lights irradiated from the backlight unit 260 via the twisting and untwisting of the liquid crystal particles 221a which is determined by whether the voltage is applied to the liquid crystal part 220.

The color filter 240 may be arranged under the upper polarizing film 210 or the lower polarizing film 230. The color filter 240 may includes a 'R' region 241 capable of transmitting only R lights out of the light emitted from the backlight unit 260, a 'G' region 243 capable of transmitting only G lights, a 'B' region 245 capable of transmitting only B lights and a black matrix 247 isolating the B region 245 to prevent the R, G and B lights from being mixed with each other.

For example, the light emitted from the LED 161 of the backlight unit 260 is a white (W) light, the R region 241 of the color filter 240 shuts off the G and B lights out of the white light and transmits only the R light. Here, The G region 243 of the color filter 240 shuts off R and B lights and transmits only a G light out of the white light. The B region of the color filter 240 shuts off R and G lights and transmits only a B light out of the white light.

The backlight unit 260 may include at least one LED 261, a light guide plate 263 which scatters or reflects the lights emitted from the LED 261 uniformly, only to guide the scattered or reflected lights toward the liquid crystal part 220, a reflection film 265 arranged under the light guide plate 263, a diffusing film 267 arranged on the light guide plate 263 and a prism sheet 269 arranged on the diffusing film 267.

The LED 261 of the backlight unit 260 may be a white light emitting diode, a blue light emitting diode (BLUE LED) or a UV light emitting diode.

The light conversion unit 250 may include quantum dot particles arranged between a bottom of the color filter 240 and a top of the backlight unit 260 and the quantum dot particles are light conversion materials.

Figure 5:
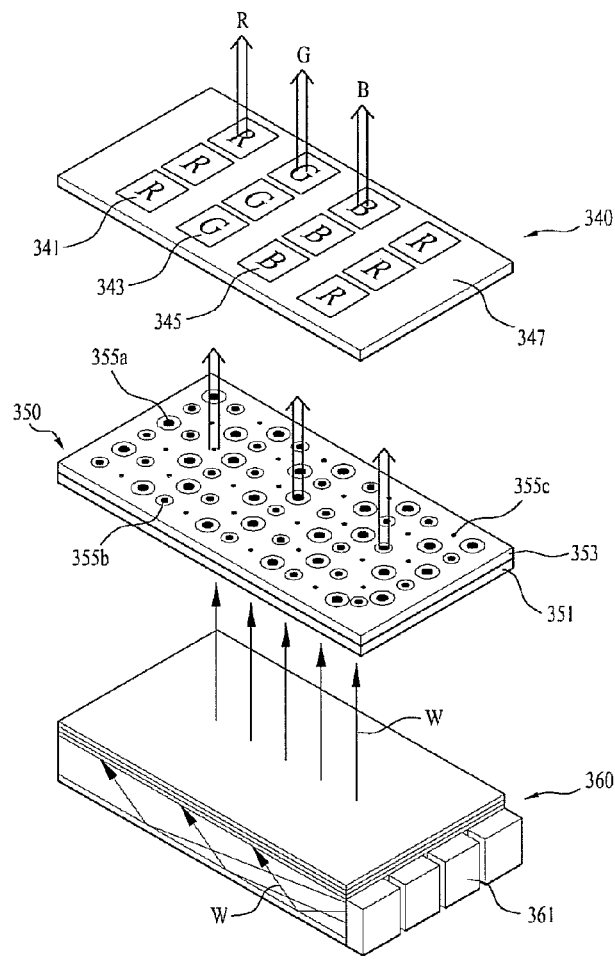
FIG. 5 is an exploded perspective view illustrating a light conversion unit and a color filter, which compose the display device related to the present invention.

FIG. 5 is an exploded perspective view illustrating a light conversion unit 350 and a color filter 340 which are possessed by a display device according to the present invention. This embodiment presents that the light emitted from the LED 361 is a white light (W).

In reference to FIG. 5, the light conversion unit 350 according to an embodiment includes a base film 351 which is light-transmittable, a light-transmittable adhesive (A) coated on the light-transmittable base film 351 and quantum dot particles 355 injected on an entire region of the light-transmittable adhesive (A) uniformly.

Here, the light conversion unit 350 includes a protection layer 353 formed to surround the quantum dot particles 533 and the protection layer 353 is formed of graphene.

The quantum dot particles 355 injected on the base film 351 are quantum dot particles 355a, 355b and 355c having three sizes which emits R, G and B lights, respectively. The quantum dot particles 355a, 355b and 355c having the three sizes are coated on the entire region of the light-transmittable base film 351 in the uniform density.

Here, the quantum dot particles 355a, 355b and 355c having the three sizes may be formed in an order of the R light emitting quantum dot particles 355a, the G light emitting quantum dot particles 355b and the B light emitting quantum dot particles 355c, to make an average particle size get smaller along the order.

Figure 6:
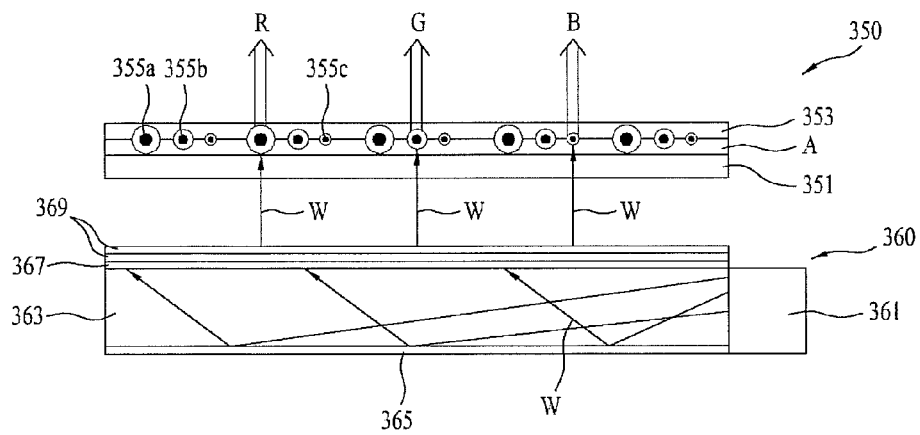
FIG. 6 is a conceptual diagram to explain light-emitting operation of the display device shown in FIG. 5.

FIG. 6 is a conceptual diagram to explain light-emitting of the display device shown in FIG. 5.

In reference to FIG. 6, the white light (W) is emitted from the LED 361 of the backlight unit 360 and the W light (that is, the white light) is guided toward the light conversion unit 350 via a light-emitting surface of the light guide plate 363.

At this time, according to the property of the quantum dot which emits a strong light having a narrow wavelength, the white light (W) guided to the light conversion unit 350 may be converted into R, G and B lights with a stronger intensity than the conventional phosphor (for example, YAG) by the quantum dot particles 355 having the three sizes. The strong R, G and B lights are compounded to form a white (W) light with a strong intensity.

The white light (W) passes the R region 341, the G region 343 and the B region 345, to be emitted as R, G and B lights with high brightness. Because of that, the display device according to the present invention, the light conversion unit 350 is arranged beyond the backlight unit 360. As a result, manufacture cost may be reduced and color presentation may be enhanced, together with brightness.

Figure 7:
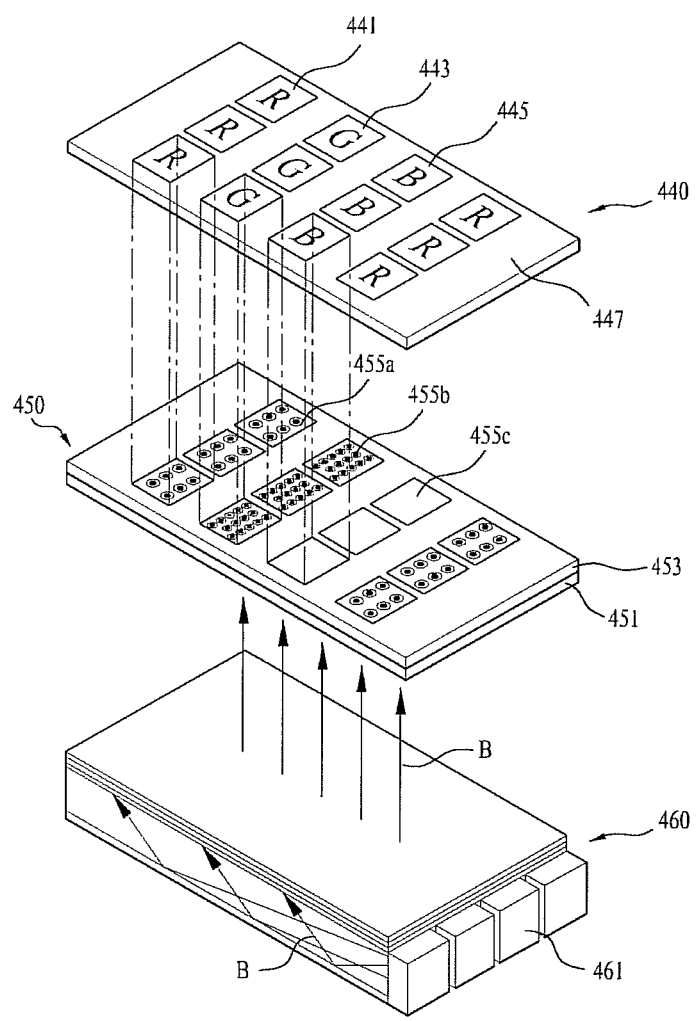
FIG. 7 is an exploded perspective view illustrating a light conversion unit and a color filter, which compose a display device related to the present invention.

FIG. 7 is an exploded perspective view illustrating a light conversion unit 450 and a color filter 440 which compose a display device according to the present invention. This embodiment presents that at least one 461 is a blue light emitting diode.

In reference to FIG. 7, the light conversion unit 450 is arranged between a top of a backlight unit 460 and a bottom of a color filter 440. The light conversion unit 450 may include a R light section 455a, a G light section 455b and a B light section 455c corresponding to the R region 441, the G region 443 and the B region 445 of the color filter 440.

The R section 455a and the G light section 455b of the light conversion unit 450 includes quantum dot particles having different sizes in the uniform density, located corresponding to the R region 441 and the G region 443 of the color filter 440, respectively. Here, the sizes of the quantum dot particles of the the R light section 455a emitting the R lights having a longer wavelength than a wavelength of the G lights may be larger than the sizes of the quantum dot particles of the G light section 455b.

In the meanwhile, the B light section 455c of the light conversion unit 450 may be a light transmission section in which no quantum dot particles are injected. In other words, B lights emitted from the blue light emitting diode 461a are transmitted toward the color filter 550 in the B light section 455c of the light conversion unit 450, not absorbed nor collided by any quantum dots.

According to a varied embodiment of the light conversion unit, a quantum dot sheet may be configured of a R light section 455a, a G light section 455b and a B light section 455c having different sizes with the uniform density, which are located corresponding to the R region, the G region and the B region of the color filter. Here, an average size of the quantum dot particles located in the R light section 455a may be much larger than an average size of the quantum dot particles located in the B light section 455c. In other words, the average size of the quantum dot particles located in the B light section 455c refers to a size small or minute enough for the B light section 455c to emit the B lights, not to affect the intensity of the B lights transmitting the light conversion unit 450 from the backlight unit 460.

In addition, the density of the quantum dot particles in the B light section 455c may be much smaller than the density of the quantum dot particles in the G light section 455b. In other words, the density of the quantum dot particles in the B light section 455c means the density minimal enough not to affect the intensity of the B lights transmitting the quantum dot sheet 450 from the backlight unit 460 as they are.

Figure 8:
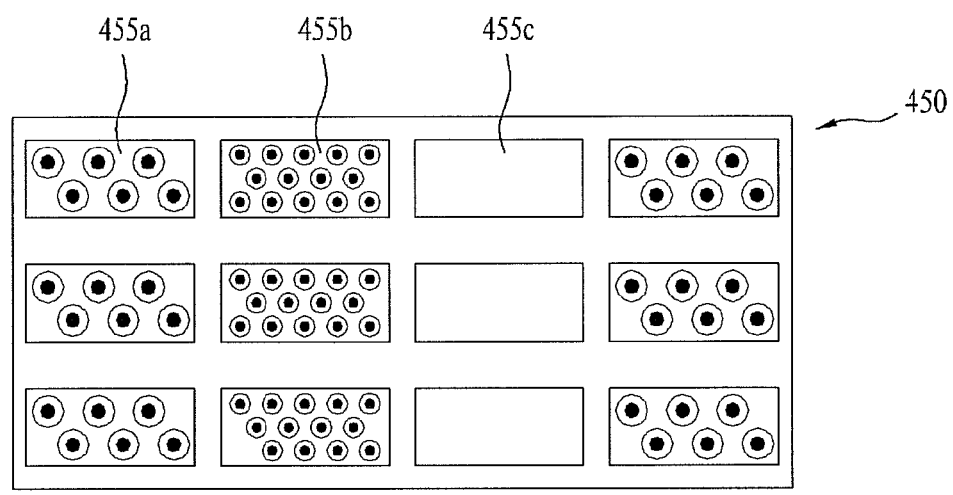
FIG. 8 is a plane view illustrating a light variation unit composing the display device shown in FIG. 7.
Figure 8:
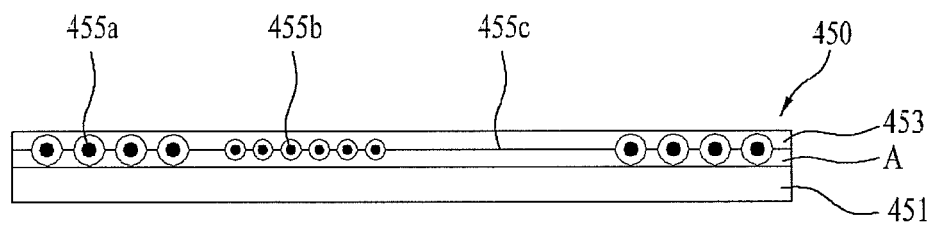

(a) of FIG. 8 is a plane view of the light conversion unit which composes the display device shown in FIG. 7 and (b) of FIG. 8 is a side sectional view of the light conversion unit which composes the display device shown in FIG. 7.

In reference to FIG. 8, the light conversion unit 450 may include a light-transmittable base film 451, a light-transmittable adhesive (A) coated on the light-transmittable base film 451, a R light section 455a and a G light section 455b arranged on a predetermined area of the light-transmittable adhesive (A), corresponding to the R region 441 and the G region 443 of the color filter 440, and a B light section 455c arranged on a predetermined area of the light-transmittable adhesive (A), corresponding to the B region 445 of the color filter 440.

Furthermore, the light conversion unit 450 includes a protection layer 453 formed to surround the quantum dot particles and the protection layer 453 is formed of grapheme.

Quantum dot particles having two different sizes are uniformly injected in the R light section 455a and the G light section 455b located on the light-transmittable adhesive (A), respectively. As mentioned above, quantum dot particles injected in the R light section 455a located on the light-transmittable adhesive (A) of the light conversion unit 450 have larger sizes than sizes of quantum dot particles injected in the G light section 455b.

In contrast, no quantum dot particles are injected in the B light section 455c located on the light-transmittable adhesive (A) of the light conversion unit 450.

Figure 9:
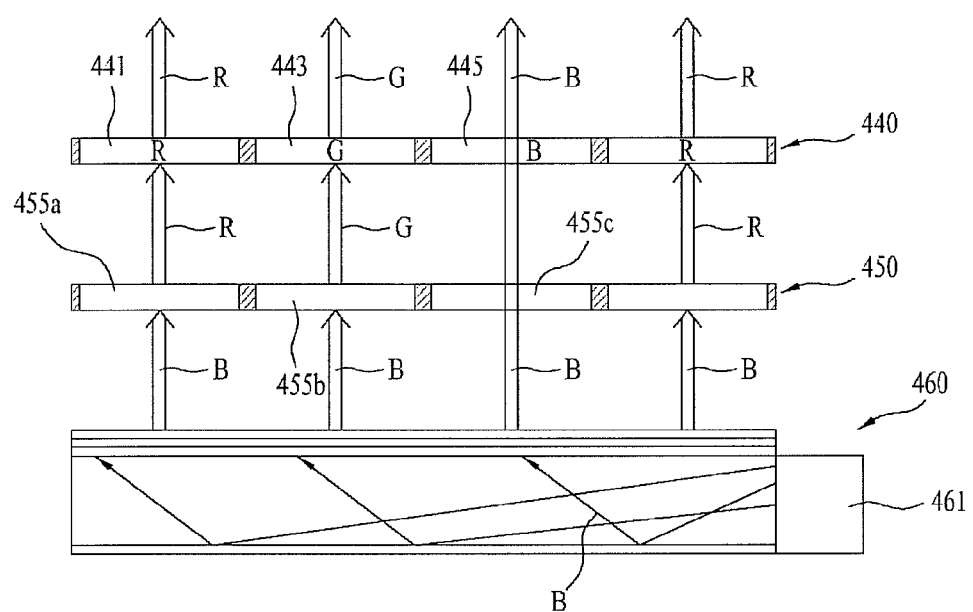
FIG. 9 is a conceptual diagram to explain light-emitting operation of the display device shown in FIG. 7.

FIG. 9 is a conceptual diagram to explain light-emitting of the display device shown in FIG. 7.

In reference to FIG. 9, the B lights emitted from the LED 461 of the backlight unit 460 are uniformly guided toward the light conversion unit 450 by a light-emitting surface of the light guide plate 463.

The B lights guided toward the R light section 455a and the G light section 455b of the light conversion unit 450 are converted into R and G lights having a stronger intensity than the intensity of the conventional phosphor (for example, YAG) by the quantum dot particles provided in the R and G light sections 455a and 455b, to be emitted outside. The B lights guided toward the B light section 455c of the quantum dot sheet 450 are not converted at all but transmitting the light conversion unit 450, with the original light intensity as it is or almost without light loss.

In reference to FIG. 9, only the R lights with the strong intensity are incident on the R region 441 of the color filter 440 and only the G lights with the strong intensity are incident on the G region 443 of the color filter 440. Also, only the R lights with the strong intensity are incident on the B region 445 of the color filter 440. In the display device according to the present invention may not be performed a process of a display part according to the prior art in which elements of the other lights (for example, G and B light elements out of elements of the white lights passing the R region of the color filter) are shut off except elements of the white lights compounded with R, G and B lights passing corresponding areas of the R, G and B regions of the color filter.

Because of that, the light conversion unit 450 provided in the display device according to the present invention performs the shut-off process of the elements of the other lights, to prevent approximately 40% to 50% light loss generated between the lights incident on the color filter and the emitted lights.

In addition, the grapheme used to form the protection layer 453 has a high resistance against gas and humidity, to prevent corruption of the quantum dots and to enhance reliability and durability of the light conversion unit. The grapheme is thin enough to manufacture a slim display device.

As mentioned above, the lighting apparatus according to the present invention and the display device including the same may enhance resistance against gas or humidity.

Furthermore, the lighting apparatus according to the present invention and the display device including the same can embody a stable optical property and enhance light-emitting efficiency.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A display device, comprising:
   a light source comprising at least one light emitting device (LED);
   a light conversion device comprising a substrate disposed in front of the light source, a quantum dot layer formed on the substrate, and a protection layer provided over the quantum dot layer;
   a color filter disposed in front of the light conversion device; and
   a liquid crystal part disposed in front of the color filter, the liquid crystal part which transmits and shuts off lights selectively,
   wherein the protection layer is formed of graphene, and
   wherein the quantum dot layer comprises an R light section, a G light section and a B light section located corresponding to an R region, a G region and a B region of the color filter.

2. The display device of claim 1, wherein the LED is a blue light emitting diode.

3. The display device of claim 1, wherein the R and G light sections comprise quantum dot particles having different sizes, and the size of a quantum dot particle located in the R light section is larger than the size of a quantum dot particle located in the G light section.

4. The display device of claim 3, wherein the B light section of the quantum dot layer is a light transmittable section comprising no quantum dot particles.

5. The display device of claim 1, wherein the substrate is a light-transmittable base film and the quantum dot layer comprises quantum dot particles injected on a surface of the base film by using a light-transmittable adhesive coated on the light-transmittable base film.

6. The display device of claim 1, wherein polarizing films are arranged in front and rear of the liquid crystal part, respectively.

* * * * *